Nov. 16, 1926. 1,606,845
L. G. SAGABIEL
STEERING GEAR
Filed March 31, 1926   2 Sheets-Sheet 2
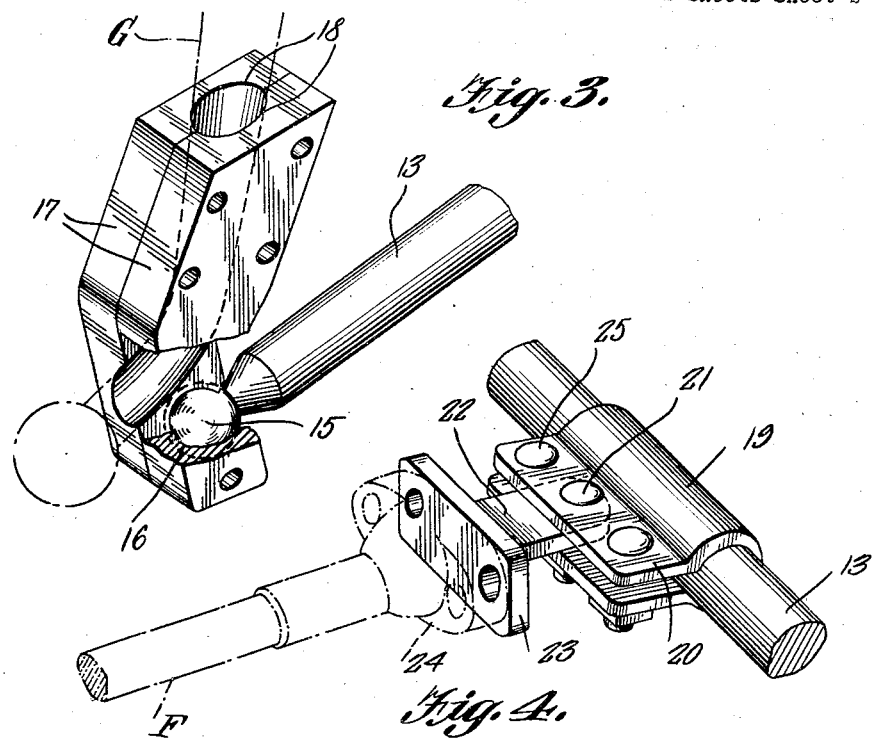
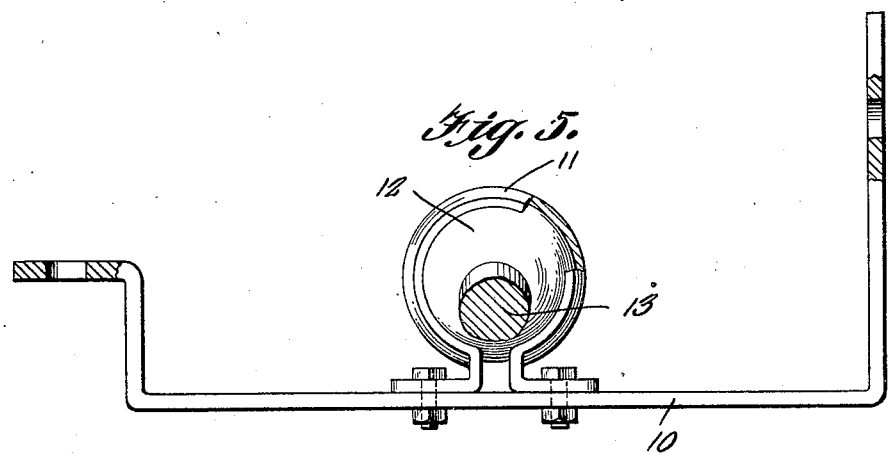
Lee G. Sagabiel, INVENTOR Patented Nov. 16, 1926.

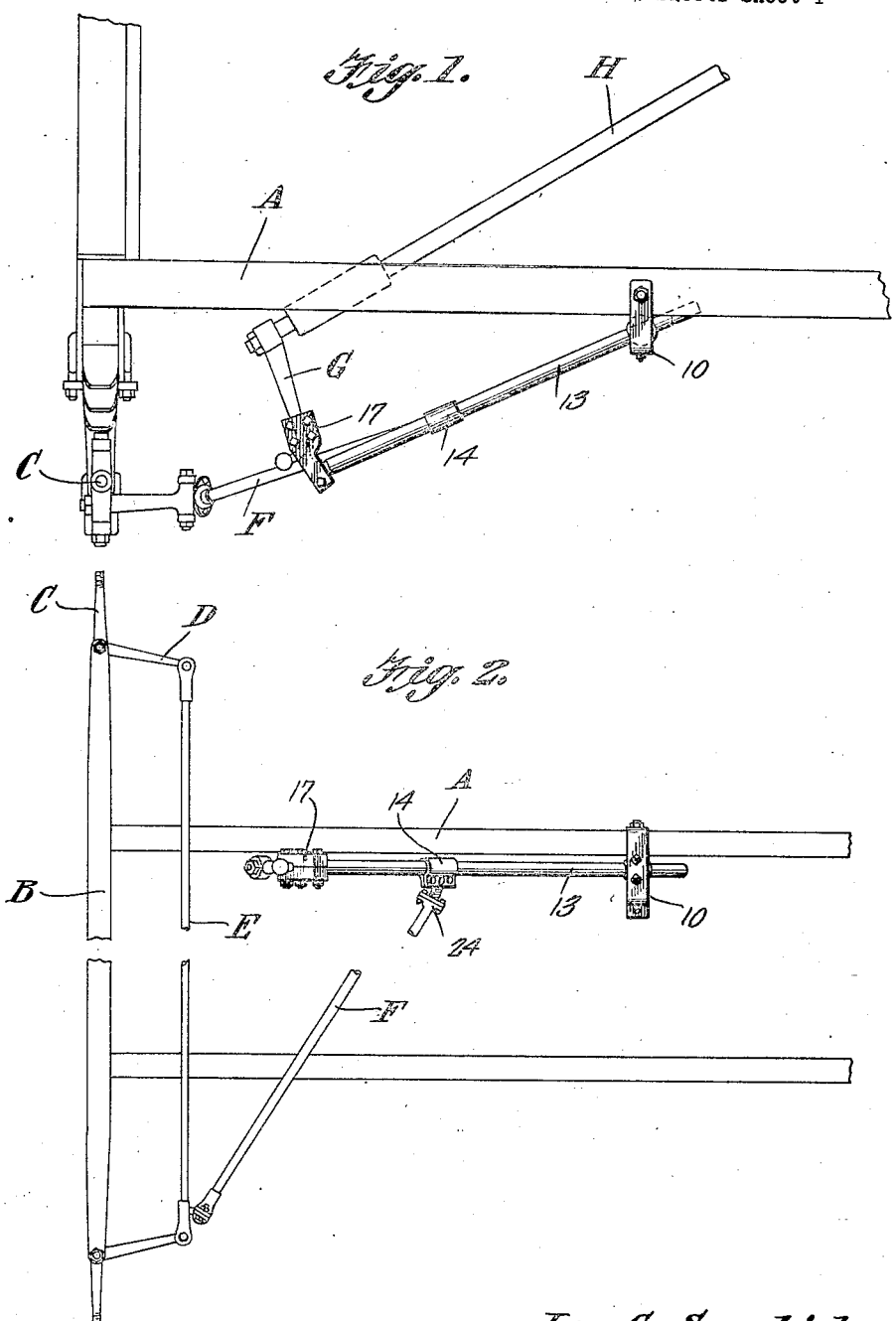

1,606,845

UNITED STATES PATENT OFFICE.

LEE GOULD SAGABIEL, OF NEW BEDFORD, PENNSYLVANIA.

STEERING GEAR.

Application filed March 31, 1926. Serial No. 98,816.

This invention relates to attachments to motor vehicles, particularly to devices used in connection with the steering gear thereof, and has for its object the provision of novel devices designed to be attached to ordinary steering gears such as forms the regular equipment, the attachment acting to lessen the jerk, jar and strain upon the arms of the driver especially when the vehicle operated is passing over rough and uneven roads.

An important and more specific object is the provision of a device of this character which is adapted to be mounted on the vehicle frame and connected with the usual steering arm, the device itself being slidably connected with the steering arm which extends to the steering arm connecting rod whereby to take the thrust out of the right-angular direction and bring it to an angle so as to relieve the strain and shock upon the steering wheel.

Another object of the invention is to provide a structure of this character which may be associated with an ordinary steering gear simply by disconnecting the steering arm from its accustomed place upon the end of the arm member carried by the steering rod and inserting the auxiliary device.

An additional object is to provide a structure of this character which will be simple and inexpensive in manufacture, easy to install, positive in action, efficient and durable in service, and a general improvement in the art.

With the above and other objects and advantages in view, the invention consists in the details of construction, arrangement and combination of elements to be hereinafter more fully described and claimed, and illustrated in the accompanying drawings, in which:

Figure 1 is a side elevation of a portion of a motor vehicle showing the device in applied position.

Figure 2 is a bottom plan view thereof.

Figure 3 is a detail perspective view, with parts broken away and in section, illustrating the connection of the device with the arm member carried by the steering rod.

Figure 4 is a detail perspective view of the connection between the steering arm and the attachment, and Figure 5 is a detail sectional view.

Referring more particularly to the drawings, the letter A designates the frame bars of the chassis of a motor vehicle, B represents the front axle, C the spindles carrying the front wheels and equipped with the spindle arms D, and E the steering arm connecting rod which, as is customary, has a ball and socket connection with a steering rod F which, under ordinary circumstances, is connected with an arm G at the lower end of the steering column or post H, the connection being one of the ball socket types.

The present invention is not at all concerned with any details of the front axle construction, the mounting of the spindles C, the arms D, rod E, post or column H or other details disclosed, the only novelty being that which will be hereinafter pointed out.

In carrying out the invention I provide a bracket device 10 suitably secured upon one of the frame bars A or the engine base as the case may be, and provided with socket means or device 11 within which is pivotally mounted a ball member 12 through which is slidable a rod 13 having a ball head 15 engaged within a socket 16 in counterpart members 17 formed with mating passages 18 for the reception of the end portion of the steering arm G as clearly indicated in Figure 3. Clearly, any suitable means may be provided for holding the counter-part members 17 in clamping relation to the member G and also the head 15.

Mounted upon the rod 13 is a split sleeve member 19 having spaced flanges 20 between which is pivotally mounted, as at 21, a lug 22 formed on a plate member 23 which is bolted or otherwise secured onto the ball socket 24 ordinarily provided at the end of the arm or rod 7. The sleeve member 19 is held in proper position upon the rod 13, by means of rivets, bolts or the like indicated at 25.

In the operation of the device, it will be observed that when the operator turns the steering post or column in the usual manner the arm G thereon will operate to swing the complementary or mating clamping members 17 and consequently move the rod 13 within the ball and socket joint provided for it at the connection with the frame. When this is done, the steering rod F having the ball and socket connection 24 with the sleeve 19 will be correspondingly moved so that the steering arm connecting rod E and consequently the steering arms D forming part of the steering spindles C will be moved. Obviously there will be no direct shock against the steering gear or steering wheel provided at the upper end of the post or column H and it will therefore be apparent that there will be no strain or jerk upon the hands or arms of the operator of the car when passing over rough and uneven roads. Clearly, the steering leverage will be greatly increased and steering made easier.

From the foregoing description and a study of the drawings, it will be readily apparent that I have thus provided a very simply constructed, inexpensive and easily applied and installed steering mechanism auxiliary to the usual mechanism by means of which the steering effort will be greatly reduced inasmuch as shocks, jars and jerks to the arms or hands of the operator will be greatly reduced if not entirely eliminated. It is really believed that the construction, operation and advantages will be readily apparent to one skilled in the art without further explanation.

While I have shown and described the preferred embodiment of the invention, it should be understood that I reserve the right to make such changes in the form, construction and arrangement of parts as will not depart from the spirit of the invention or the scope of the subjoined claims.

Having thus described the invention, I claim:

1. In combination with the steering post, the steering arm, frame, steering rod and steering arm connecting rod of a vehicle, an auxiliary steering device comprising a bracket member adapted to be mounted upon the vehicle frame, a ball member mounted within said bracket member, a rod slidably mounted through said ball member, said rod having a ball and socket connection with the steering arm connecting rod of the vehicle.

2. In combination with the steering post, steering arm, frame, steering rod and steering arm connecting rod of a vehicle, a bracket member mounted on the vehicle frame and formed with a socket, a ball rockably mounted within said socket, a rod slidable through the ball, a sectional clamping member engaged upon the steering arm and having a socket, a ball on said rod engaged within said last named socket, a sleeve clamped upon the rod, and a member pivotally connected with the sleeve and connected with the steering rod.

In testimony whereof I affix my signature.

LEE GOULD SAGABIEL.